US008623553B2

(12) United States Patent
Zhang et al.

(10) Patent No.: US 8,623,553 B2
(45) Date of Patent: Jan. 7, 2014

(54) NON-AQUEOUS ELECTROCHEMICAL CELL HAVING A MIXTURE OF AT LEAST THREE CATHODE MATERIALS THEREIN

(75) Inventors: Dong Zhang, Joplin, MO (US); Ernest Ndzebet, Joplin, MO (US); Min Qi Yang, Webb City, MO (US); Viet Vu, Carl Junction, MO (US); Umamaheswari Janakiraman, Webb City, MO (US); Mario Destephen, Joplin, MO (US)

(73) Assignee: Eaglepicher Technologies, LLC, Joplin, MO (US)

(*) Notice: Subject to any disclaimer, the term of this patent is extended or adjusted under 35 U.S.C. 154(b) by 184 days.

(21) Appl. No.: 12/725,872

(22) Filed: Mar. 17, 2010

(65) Prior Publication Data

US 2010/0310908 A1    Dec. 9, 2010

Related U.S. Application Data

(60) Provisional application No. 61/161,303, filed on Mar. 18, 2009, provisional application No. 61/161,300, filed on Mar. 18, 2009, provisional application No. 61/173,534, filed on Apr. 28, 2009.

(51) Int. Cl.
| H01M 4/58 | (2010.01) |
| H01M 4/50 | (2010.01) |
| H01M 4/52 | (2010.01) |
| H01M 4/54 | (2006.01) |
| H01M 4/62 | (2006.01) |

(52) U.S. Cl.
USPC ............... 429/231.7; 429/212; 429/218.1; 429/220; 429/231.4

(58) Field of Classification Search
USPC ............. 429/212, 218.1, 220, 231.4, 231.7, 429/231.8
See application file for complete search history.

(56) References Cited

U.S. PATENT DOCUMENTS

| 3,898,096 | A | 8/1975 | Heredy et al. |
| 3,992,222 | A | 11/1976 | Walsh et al. |
| 4,259,415 | A | 3/1981 | Tamura et al. |
| 4,608,324 | A | 8/1986 | Fujii et al. |
| 4,728,590 | A | 3/1988 | Redey |
| 4,954,403 | A | 9/1990 | Plichta et al. |
| 5,180,642 | A | 1/1993 | Weiss et al. |
| H001335 | H | 7/1994 | Plichta et al. |
| 5,534,367 | A | 7/1996 | Kaun |
| 5,667,916 | A | 9/1997 | Ebel et al. |
| 5,696,437 | A | 12/1997 | Panther et al. |
| 5,736,275 | A | 4/1998 | Kaun |
| 6,465,129 | B1 | 10/2002 | Xu et al. |
| 6,580,908 | B1 | 6/2003 | Kroll et al. |
| 6,584,355 | B2 | 6/2003 | Stessman |
| 6,936,379 | B2 * | 8/2005 | Gan et al. ............... 429/231.5 |
| 7,476,467 | B2 | 1/2009 | Park et al. |
| 2003/0082452 | A1 | 5/2003 | Ueda et al. |
| 2003/0104269 | A1 | 6/2003 | Gan et al. |
| 2003/0228520 | A1 | 12/2003 | Kaun |
| 2005/0003269 | A1 | 1/2005 | Nanjundaswamy et al. |
| 2005/0048370 | A1 | 3/2005 | Guidotti et al. |
| 2005/0102005 | A1 | 5/2005 | Krig et al. |
| 2007/0077488 | A1 | 4/2007 | Chen et al. |
| 2007/0099080 | A1 | 5/2007 | Pickett et al. |
| 2007/0250126 | A1 | 10/2007 | Maile et al. |
| 2007/0281213 | A1 * | 12/2007 | Pyszczek .................. 429/231.7 |
| 2007/0292748 | A1 | 12/2007 | Dekel et al. |
| 2008/0090138 | A1 | 4/2008 | Vu et al. |
| 2008/0182170 | A1 | 7/2008 | Rong et al. |
| 2008/0299447 | A1 | 12/2008 | Fujiwara |
| 2010/0310917 | A1 | 12/2010 | Swift et al. |

FOREIGN PATENT DOCUMENTS

| EP | 1207568 A2 | 5/2002 |
| EP | 1 295 851 A1 | 3/2003 |
| JP | A-61-135056 | 6/1986 |
| JP | 2061962 A | 3/1990 |
| JP | 2267861 A | 11/1990 |
| JP | A-2004-207210 | 7/2004 |
| WO | 2005060026 A2 | 6/2005 |
| WO | 2009014845 A2 | 1/2009 |

OTHER PUBLICATIONS

Co-owned U.S. Appl. No. 12/614,667, filed Nov. 9, 2009 entitled "Non-Aqueous Cell Having Amorphous or Semi-Crystalline Copper Manganese Oxide Cathode Material".
International Search Report and Written Opinion dated Jan. 28, 2010 for International Application No. PCT/US2009/063716.
International Search Report and Written Opinion for International Application No. PCT/US2010/029984, dated May 25, 2010, 13 pages.
International Search Report and Written Opinion for International Application No. PCT/US2010/026408, dated May 10, 2010, 13 pages.
International Search Report and Written Opinion for International Application No. PCT/US2010/029980, dated Jun. 1, 2010, 15 pages.
International Search Report and Written Opinion for International Application No. PCT/US2010/027612 mailed Jul. 27, 2010, 12 pages.
Sep. 20, 2011 International Preliminary Report on Patentability issued in Application No. PCT/US2010/027612.

(Continued)

*Primary Examiner* — Patrick Ryan
*Assistant Examiner* — Ladan Mohaddes
(74) *Attorney, Agent, or Firm* — Oliff & Berridge, PLC

(57) ABSTRACT

The present disclosure relates generally to a high capacity cathode material suitable for use in a non-aqueous electrochemical cell that comprises a mixture of at least three different cathode materials, and more specifically a mixture of fluorinated carbon, an oxide of copper and an oxide of manganese. The present disclosure additionally relates to a non-aqueous electrochemical cell comprising such a cathode material and, in particular, to such a non-aqueous electrochemical cell that can deliver a higher capacity than a conventional cell, and/or that possesses an improved end-of-life indication.

19 Claims, 9 Drawing Sheets

(56) References Cited

OTHER PUBLICATIONS

Hiroi et al., "Effective conductivities of FeS positives in LiCl-LiBr-LiF electrolyte at different states of charge", J. of Applied Electrochemistry 16 (1986), pp. 309-311.
Masset et al., "Retained molten salt electrolytes in thermal batteries", J. of Power Sources 139 (Available online Sep. 8, 2004), pp. 356-365.
Oct. 24, 2011 European Search Report issued in European Patent Application No. 11171301.2-2119.
U.S. Appl. No. 12/754,405, filed Apr. 5, 2010 in the name of Swift et al.
U.S. Appl. No. 12/718,743, filed Mar. 5, 2010 in the name of Miller et al.
U.S. Appl. No. 13/161,614, filed Jun. 16, 2011 in the name of Swift et al.
U.S. Appl. No. 12/754,417, filed Apr. 5, 2010 in the name of Swift et al.
U.S. Appl. No. 61/112,562, filed Nov. 7, 2008 in the name of Chang et al.
Sep. 14, 2012 Office Action issued in U.S. Appl. No. 12/614,667.
Aug. 29, 2012 Office Action issued in U.S. Appl. No. 12/754,405.
Nov. 13, 2012 Office Action issued in U.S. Appl. No. 12/754,417.
Oct. 16, 2012 Office Action issued in European Patent Application No. 09 752 072.0.
Mar. 14, 2013 Office Action issued in U.S. Appl. No. 12/718,743.
Mar. 7, 2013 Office Action issued in U.S. Appl. No. 13/161,614.
Jul. 2, 2013 Office Action issued in U.S. Appl. No. 12/718,743.
Apr. 11, 2013 Office Action issued in U.S. Appl. No. 12/614,667.

\* cited by examiner

NON-AQUEOUS ELECTROCHEMICAL CELL HAVING A MIXTURE OF AT LEAST THREE CATHODE MATERIALS THEREIN

CROSS-REFERENCE TO RELATED APPLICATIONS

This application claims priority from U.S. Provisional Patent Application No. 61/161,303 (filed Mar. 18, 2009), No. 61/161,300 (filed Mar. 18, 2009), and No. 61/173,534 (filed Apr. 28, 2009), the entire contents of each being incorporated herein by reference.

FIELD OF THE DISCLOSURE

The present disclosure relates generally to a high capacity cathode material suitable for use in a non-aqueous electrochemical cell that comprises a mixture of at least three different cathode materials, and more specifically a mixture of fluorinated carbon, an oxide of copper and an oxide of manganese. The present disclosure additionally relates to a non-aqueous electrochemical cell comprising such a cathode material and, in particular, to such a non-aqueous electrochemical cell that can deliver a higher capacity than a conventional cell, and/or that possesses an improved end-of-life indication.

BACKGROUND OF THE DISCLOSURE

Lithium electrochemical cells, which are more commonly referred to as batteries, are widely used in a variety of military and consumer products. Many of these products utilize high energy and high power batteries. Due in part to the miniaturization of portable electronic devices, it is desirable to develop even smaller lithium batteries with an increased power capability and service life. One way to develop smaller batteries with increased service life is to develop higher energy cathode materials.

One example of a high energy cathode material is fluorinated carbon (i.e., $CF_x$). $CF_x$ is often used with a lithium anode in non-rechargeable (primary) batteries for, among other things, military devices and implantable medical devices. $CF_x$ (where x=1.0) has a specific energy of about 860 mAh/g. $CF_x$ is recognized to be useful in devices in which end-of-life (or end-of-service) is an important or essential feature. Other examples of high energy cathode materials include silver vanadium oxide and manganese dioxide, which have specific capacities of about 315 and 308 mAh/g, respectively.

The cathodes for rechargeable (secondary) batteries, such as Li ion batteries, generally have lower energy storage capability than primary battery cathodes. However, secondary batteries can typically be recharged several hundred times, which significantly reduces the lifetime cost as well as the battery disposal costs. Examples of secondary battery cathodes used in Li ion batteries include lithium cobalt oxide, lithium iron phosphate, and lithium nickel cobalt oxide.

To satisfy the demands for longer lasting or smaller batteries, there continues to be a need to develop cathodes exhibiting higher energy like primary batteries with the possibility of partial or fully rechargeable capability like secondary batteries, thus extending lifetime and effectively reducing the overall cost. Mixed cathode materials have been proposed as one possible approach for achieving such improved primary and/or secondary batteries. Other benefits of mixed cathode materials include enhancing the rate capability and/or stability of the cathode, and/or providing improved end-of-life indication, while maintaining the energy density per weight and/or per volume. Approaches for achieving such benefits have typically involved mixing a high rate-capable cathode material with a high energy-density cathode material.

U.S. Pat. No. 7,476,467 discloses a cathode material for secondary lithium batteries. The cathode active material comprises a mixture of (A) a lithium manganese-metal composite oxide having a spinel structure, and (B) a lithium nickel-manganese-cobalt composite oxide having a layered structure. The cathode active material is said to have superior safety and a long-term service life at both room temperature and high temperature due to improved properties of lithium and the metal oxide.

It is known to those skilled in the art that composite cathodes comprising fluorinated carbon with some other metal oxide are used for the purpose of providing the battery with an end-of-life (EOL) indicator. For example, U.S. Pat. No. 5,667,916 describes a battery having a cathode mixture of $CF_x$ and other materials, including for example copper oxide, the other material or mixtures of other materials serving as the end-of-life indicator. Similarly, U.S. Pat. No. 5,180,642 discloses electrochemical cells or batteries having a cathode mixture comprised of manganese dioxide ($MnO_2$), carbon monofluoride ($CF_x$, where x=1), or mixtures of the two, and an end-of-life additive selected from the group consisting of vanadium oxide, silver vanadate, bismuth fluoride and titanium sulfide. U.S. Pat. No. 4,259,415 provides a cathode material as an end-of-life indicator comprising a main positive active material and a precursor. Suitable main positive active materials include molybdenum oxide ($MoO_3$), silver oxide ($Ag_2O$), and graphite fluoride $(CF)_n$.

Although many batteries or cells developed to-date include end-of-life indicators, the energy density is less than desired. The capacity (e.g. mAh/gm or mAh/cc) of the EOL additive to $CF_x$ (for example, silver vanadium oxide, or SVO) is lower than that of the $CF_x$ material, resulting in a composite electrode with a total capacity lower than that of the $CF_x$ by itself. Additionally, or alternatively, many batteries or cells developed to-date exhibit an initial voltage sag or drop at the beginning of the discharge. Therefore, a need continues to exist for improved cells, and more particularly for improved cathode materials for use in such cells.

SUMMARY OF THE DISCLOSURE

Briefly, therefore, the present disclosure is directed to a non-aqueous electrochemical cell. The cell comprises: (i) an anode; (ii) a cathode comprising a cathode material comprising a mixture of fluorinated carbon, an oxide of copper, and an oxide of manganese. In one particular embodiment, the cathode material comprises a mixture of: fluorinated carbon having a formula $(CF_x)n$, where x is between about 0.1 and about 1.9 and n is between about 1 and about 5; an oxide of copper having a formula $CuO$ or $Cu_2O$, or a mixture thereof; and, an oxide of manganese having a formula $MnO_2$.

The present disclosure is further directed to such a non-aqueous electrochemical cell, wherein the concentration of fluorinated carbon in the cathode material mixture is greater than about 50 wt %, based on the total weight of the cathode mixture. Additionally, or alternatively, the present disclosure is directed to such a non-aqueous electrochemical cell wherein the weight ratio of fluorinated carbon to the combination of the oxide of copper and the oxide of manganese is greater than about 1:1. In one particular embodiment thereof, the oxide of copper and the oxide of manganese are (i) $CuO$ or $Cu_2O$, or a mixture thereof, and (ii) $MnO_2$, respectively.

The present disclosure is still further directed to such a non-aqueous electrochemical cell, wherein the cathode material mixture present in the cathode therein (and as detailed above) has a higher volumetric specific capacity than that of fluorinated carbon alone, and more particularly has a volumetric specific capacity that is at least about 10% higher, about 15% higher, or more.

The present disclosure is still further directed to one of the foregoing non-aqueous electrochemical cells, wherein the cell is internally rechargeable, and/or wherein the cell exhibits an improved end-of-life indication (as compared to a similarly prepared cell having only fluorinated carbon as the cathode materials therein), and more particularly exhibits an end-of-life indication that is at least about 5% greater.

The present disclosure is still further directed to various electronic devices comprising such an electrochemical cell.

It is to be noted that one or more of the additional features detailed below may be incorporated into one or more of the above-noted embodiments, without departing from the scope of the present disclosure.

DETAILED DESCRIPTION OF THE DISCLOSURE

Figure 1:
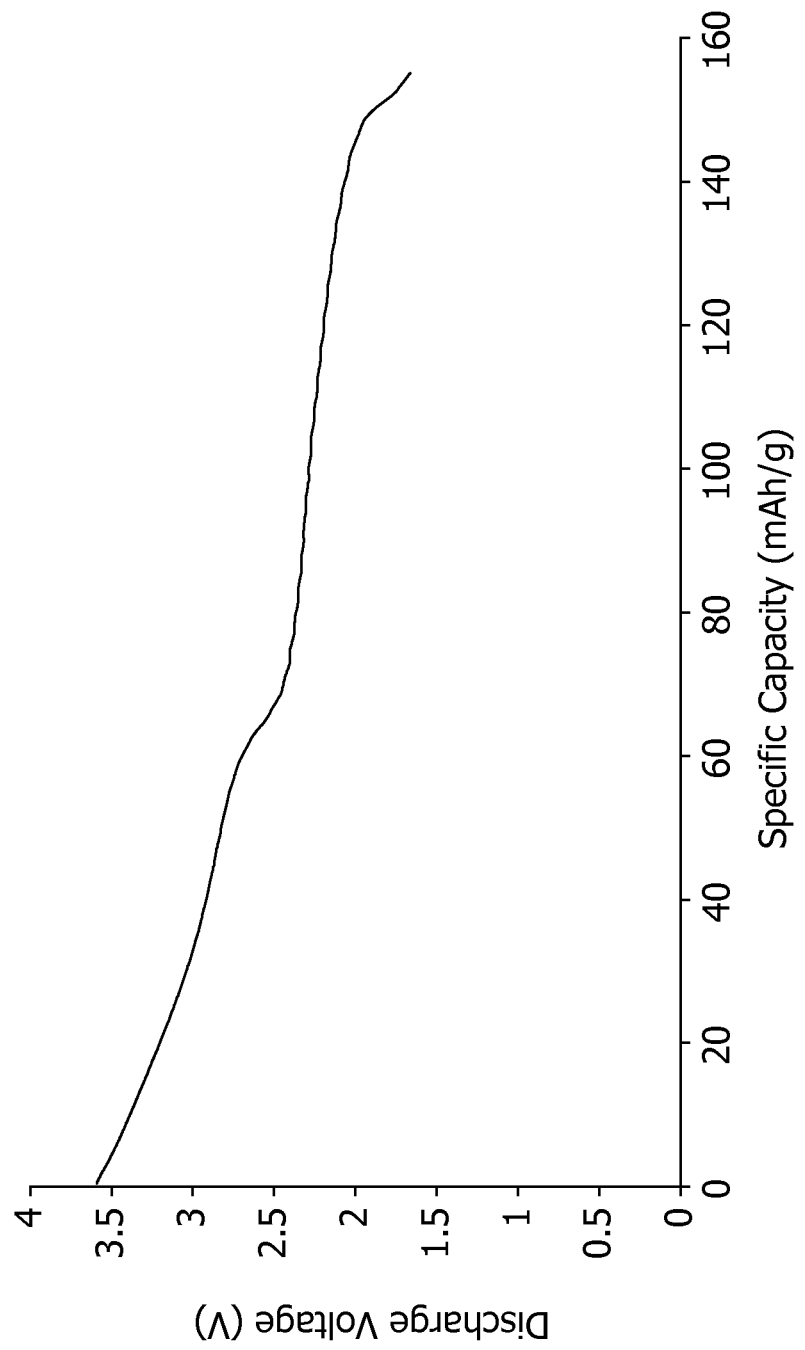
FIG. 1 is a graph for the discharge of a Li/(CuO+CMD) cell at 10 mA/g discharge rate.

1. Cathode Material Composition and Cell Components

In accordance with the present disclosure, and as further detailed herein below, it has been discovered that one or more performance properties of a non-aqueous electrochemical cell may be improved or enhanced by the use of a cathode material comprising a mixture of fluorinated carbon and at least two additional metal oxide cathode materials, wherein one or both of the at least two additional metal oxide cathode materials (or a resulting mixture thereof) has an operating voltage that is at least about 500 mV lower than the operating voltage of the fluorinated carbon material, and some embodiments may have an operating voltage that is about 550, about 600, about 650, about 700, or even about 750 mV lower than the operating voltage of the fluorinated carbon material (as determined by means generally known in the art). More particularly, it has been discovered that performance of such a non-aqueous cell may be improved or enhanced when the cathode material comprises (or alternative consists, or consists essentially, of) a mixture of fluorinated carbon (i.e., $(CF_x)n$, as further detailed herein), an oxide of copper (e.g., $CuO$ or $Cu_2O$), and an oxide of manganese (e.g., $MnO_2$, in the form of natural $MnO_2$ (NMD), chemical $MnO_2$ (CMD), and/or electrolytic $MnO_2$ (EMD)).

In this regard it is to be noted that, as used herein, and "oxide" of a metal refers to a compound that consists, or consists essentially of, only the recited metal and oxygen. For example, an "oxide" of copper refers to a compound that consists (or consists essentially) of oxygen and copper only (e.g., $CuO$ or $Cu_2O$). Additionally, a "mixture" refers to a physical mixture of the various cathode materials, each material therefore being distinct or identifiable from the other materials present therein. For example, when the cathode material comprises fluorinated carbon, and oxide of copper, and an oxide of manganese, the mixture comprises (or consists/consists essentially of) three individual compounds: a compound that consists (or consists essentially) of carbon and fluorine; a compound that consists (or consists essentially) of copper and oxygen; and, a compound that consists (or consists essentially) of manganese and oxygen (e.g., $MnO_2$). As such, an "oxide" of copper or manganese is not intended to refer to or encompass, for example, a mixed metal oxide such as copper manganese oxide.

In this regard it is to be further noted, however, that in all embodiments the at least two additional metal oxide cathode materials do not have to be dispersed in the fluorinated carbon cathode material (at the particle level). Alternatively, these two additional metal oxide cathode materials may be present as a distinct or stand-alone layer (or layers) that is (are) in contact with the fluorinated carbon (layer). In yet another alternative embodiment, these at least two additional metal oxide cathode materials may be present as a distinct or stand-alone layer (or layers) on a side of the current collector that is opposite that of the side on which the fluorinated carbon layer is present.

In this regard it is to be still further noted that, as used herein, "non-aqueous" refers to an electrochemical cell that comprises or utilizes an organic solvent, or a mixture of organic solvents, in combination with an inorganic or organic salt, as an electrolyte. Accordingly, the non-aqueous electrolyte contains no added water; that is, water was not added to the electrolyte as a separate or distinct component thereof, but nevertheless may be present as a trace or underlying component or contaminant of the organic solvent(s) used to prepare it. For example, in one or more non-limiting embodiments of the present disclosure, the electrolyte may typically have a water content of less than about 1000 ppm, about 750 ppm, about 500 ppm, about 250 ppm, about 100 ppm, about 50 ppm, about 25 ppm, about 20 ppm, or even less.

In this regard it is to be still further noted that an electrochemical cell may otherwise be referred to herein as a battery, a capacitor, a cell, an electrochemical device, or the like. It should be understood that these references are not limiting, and any cell that involves electron transfer between an electrode and an electrolyte is contemplated to be within the scope of the present disclosure.

In this regard it is to be still further noted that "improved" or "enhanced" performance properties generally refers to an improvement or enhancement in the specific energy, the energy density (or volumetric specific capacity), the operating voltage, the rate capability, and/or the end-of-life behavior or indicator of the non-aqueous electrochemical cell of the present disclosure, as compared for example to a non-aqueous electrochemical cell that is similarly prepared or designed but that lacks the cathode material as detailed herein (e.g., as compared to an electrochemical cell that utilizes only $CF_x$ as the cathode material), by for example at least about 2.5%, about 5%, about 7.5%, about 10% or more (e.g., at least about 12.5%, about 15%, about 20%, about 25% or more). In one particular embodiment, for example, the end-of-life indication is improved or increased by at least about 2.5%, about 5%, about 7.5%, about 10% or more. In this or another particular embodiment, for example, the volumetric specific is capacity that is improved or increased by at least about 10% higher, about 15%, about 20%, about 25% or more.

As previously noted, the cathode material of the present disclosure contains a mixture of at least three distinct components or compounds: one being fluorinated carbon, with the other two being different metal oxides (and more specifically an oxide of copper and an oxide of manganese), wherein one or both of the at least two additional metal oxides, or a resulting mixture thereof, have an operating voltage as noted above, relative to that of the fluorinated carbon material. The concentration of fluorinated carbon in the cathode material mixture is greater than about 50 wt %, based on the total weight of the cathode material mixture, one or both of the other two additional cathode materials (i.e., the "minor portion" of the cathode material) acting for example as an end-of-life indicator. In various alternative embodiments, however, the concentration of the fluorinated carbon in the cathode material mixture may be about 60 wt %, about 70 wt %, about 80 wt %, about 90 wt %, or even about 95 wt % (the concentration, for example, being within the range of about 60 wt % to about 95 wt %, or about 70 wt % to about 85 wt %), while the combined concentration of the at least two additional metal oxides may about 40 wt %, about 30 wt %, about 20 wt %, about 10 wt %, or even about 5 wt % (the concentration, for example, being within the range of about 5 wt % to about 40 wt %, or about 15 wt % to about 30 wt %), based on the total weight of the cathode material. Stated another way, the weight ratio of the fluorinated carbon cathode material, relative to the combined weight of the at least two additional metal oxides, is greater than about 1:1 (e.g., about 2:1, about 4:1, about 6:1, about 8:1 or more).

In one particularly preferred embodiment, the at least two additional metal oxide cathode materials are an oxide of copper, and more particularly either cupric oxide (CuO) or cuprous oxide ($Cu_2O$), and an oxide of manganese, and more particularly manganese dioxide ($MnO_2$), although other forms may also be present (e.g., MnO, $Mn_3O_4$, $Mn_2O_3$, or $Mn_2O_7$). Although the weight ratio of the at least two additional metal oxide cathode materials may vary (relative to each other), typically the ratio of one of metal oxides to the other ranges from about 1:1 to about 5:1, or about 1.5:1 to about 4:1, or about 2:1 to about 3:1. For example, in various embodiments, the oxide of manganese may be in excess as compared to the oxide of copper, the ratio being for example greater than about 1:1 and less than about 3:1, or about 1.5:1 to about 2.5:1. In various alternative embodiments, however, the oxide of copper may be in excess as compared to the oxide of manganese, the ratio being for example greater than about 1:1 and less than about 4.5:1, or about 1.5:1 and less than about 4:1, or about 2:1 to about 3:1.

In this regard it is to be noted that, in a preferred embodiment, one or both of the at least two additional metal oxide cathode materials, and more particularly the oxide of copper, is in nano-particle size; that is, the particle size of the material (e.g., the oxide of copper) is on the nanometer scale, the size ranging for example from about 15 to about 45 nanometers, or from about 20 to about 40 nanometers, or from about 23 nanometers to about 37 nanometers. In one particularly preferred embodiment, the nano-particles are sufficiently small, such that they may easily be dispersed around and/or between larger particles of the other additional cathode material (e.g., larger particles of an oxide of manganese, and/or $CF_x$).

It is to be further noted that, in this or another preferred embodiment, that the oxide of manganese is preferably manganese dioxide, and more preferable is natural (NMD), chemical (CMD), or electrolytic (EMD).

In addition to the fluorinated carbon cathode material, and other two additional metal oxide cathode materials, as detailed herein, the other components of the non-aqueous electrochemical cell may be selected from among those generally known in the art. For example, according to various embodiments of the present disclosure, the cathode may also include a binder, for example, a polymeric binder such as polytetrafluoroethylene (PTFE) or polyvinylidene fluoride (PVDF), which may optionally be in powdered form. Additionally, carbon materials such as carbon black (e.g., Super P, from Timcal), natural and synthetic graphite, as well as their various derivatives (including graphene, graphite nano platelets, expanded graphite—such as KS4, from Timcal), carbon nano-fibers, and non-graphitic forms of carbon, such as coke, charcoal or activated carbon, may be used as conductive fillers in the cathodes. Alternatively, conductive fillers such as metallic powders (e.g., powders such as silver, nickel, aluminum, titanium and stales steel in powder form) may also be useful as conductive diluents, when mixed with the other cathode materials.

Typically, the concentration of the binder in the cathode, or more specifically the cathode active material, is in the range of from about 1 wt % to about 5 wt %, or about 2 wt % to about 4 wt %, and in some embodiments may be about 3 wt % (as compared for example to the total weight of the cathode material). Additionally, or alternatively, the concentration of the conductive filler or additive in the cathode, or more specifically the cathode active material, is in the range of from about 1 wt % to about 5 wt %, or about 2 wt % to about 4.5 wt %, and in some embodiments may be about 4 wt % (as compared for example to the total weight of the cathode material). In this regard it is to be noted, however, that such ranges should not be viewed in a limiting sense.

As previously noted, that cathode material additional comprises, or consists (or consists essentially) of, a fluorinated, carbonaceous active material, and includes fluorinated, graphitic material such as fluorinated natural and synthetic graphite and all their derivatives including graphene, graphite nano-platelet, expanded graphite, carbon nano-fiber and non-graphitic forms of carbon such as coke, charcoal or activated carbon. In one preferred embodiment, the carbonaceous material is preferably prepared fluorinated carbon generally represented by the formula $(CF_x)n$, wherein x typically varies between about 0.1 to 1.9, preferably between about 0.4 and 1.2, and more preferably between about 0.6 and 1.0. The fluorinated carbon can also be a mixture of $(CF_{x1})n$ and $(CF_{x2})m$, where x1 is preferably about 0.8 to 1.2, and x2 is preferably about 0.4 to 0.8. In this regard it is to be noted that in the formulas $(CF_x)n$ and $(CF_{x1})n$, as well as $(CF_{x2})m$, n and m refer to the number of monomer units which can vary widely, but may be for example within the range of about 1 to about 5. Accordingly, the ratio of $(CF_{x1})$ to $(CF_{x2})$ may be, for example, between about 5:1 and about 1:5, about 4:1 and about 1:4, or about 3:1 and about 1:3, or about 2:1 and about 1:2, or even a ratio of about 1:1; stated another way, the cathode material of the present disclosure, in various embodiments, may contain a mixture of $CF_x$, such as for example a mixture of $CF_1/CF_{0.6}$, wherein the mixture has contains for example about 90% $CF_1$ and about 10% $CF_{0.6}$, or about 80% $CF_1$ and about 20% $CF_{0.6}$, or about 75% $CF_1$ and about 25% $CF_{0.6}$, or about 67% $CF_1$ and about 33% $CF_{0.6}$, or about 50% $CF_1$ and about 50% $CF_{0.6}$, or vice versa.

It is to be noted that the precise composition of the precise composition of the fluorinated carbon, and/or the composition of the at least two additional metal oxide cathode material components, and/or the respective particles sizes thereof, and/or the respective concentrations of fluorinated carbon and the at least two additional cathode material components, present in the cathode material may be optimized for a given application or use, by means generally known in the art. For example, in one particular embodiment, one or more of these factors may be controlled or optimized in order to improve or enhance the end-of-life behavior of the electrochemical cell. More specifically, one or more of these factors may be controlled or optimized in order to ensure that the electrochemical cell possess or exhibits a voltage plateau after some period of use or discharge, which may act as a useful end-of-life indicator. In this regard it is to be further noted that the discharge voltage of fluorinated carbon is typically between about 2.5 volt (V) and about 2.8V, depending on the discharge rate. In contrast, for example, the oxide of copper (e.g., CuO or $Cu_2O$) present in the cathode material of the disclosure may exhibit a voltage plateau between about 1.6 V and about 2.3 V, and/or the oxide of manganese (e.g., $MnO_2$) present in the cathode material of the disclosure may exhibit a voltage plateau between about 1.7 V and about 2.4 V.

As used herein, "voltage plateau" generally refers to a portion of the discharge curve that is substantially or relatively flat, within the noted voltage range, for some measurable or detectable period (e.g., over some measurable range of specific capacity values). This voltage plateau is well-suited as end-of-life indicator for, as an example, a fluorinated carbon/oxide of copper/oxide of manganese non-aqueous electrochemical cell, in accordance with the present disclosure. The amount (i.e., concentration and/or ratio), composition, and/or form of these oxides (e.g., oxide of copper and oxide of manganese) and fluorinated carbon can be optimized to give the desire end-of-life behavior for different applications (the concentrations or ratios of these cathode materials, for example, having an effect on the specific capacity range at which or over which this plateau is observed).

As previously noted, the respective concentrations of fluorinated carbon and the at least two additional metal oxide cathode materials (e.g., an oxide of copper and an oxide of manganese) may be optimized for a given application or use, by means generally known in the art. Accordingly, the concentrations provided herein should be viewed as illustrative, and therefore should not be viewed in a limiting sense. For example, in various alternative embodiments, the two additional metal oxide cathode material components may, in combination, be the major component of the cathode material (rather than for example the fluorinated carbon). Additionally, it is to be noted that, in some embodiments, the cathode material may consist of or consist essentially of the components; that is, the sum of the concentrations (or weight percents) of the fluorinated carbon and the at least two additional metal oxide cathode materials (e.g., an oxide of copper and an oxide of manganese) may be about 100%.

It is also to be noted that, among the various embodiments of the present disclose, are included those wherein the cathode material is non-lithiated. Stated another way, the cathode material is prepared such that, at least initially (i.e., prior to use), the cathode material is essentially free of lithium or lithium ions therein (i.e., lithium or lithium ions are not intentionally added as a component of the cathode material during preparation). In one particular embodiment, the cathode materials consists essentially of fluorinated carbon, an oxide of copper and an oxide of manganese, and optionally a binder material and/or a conductive additive (both as further detailed elsewhere herein). For example, in one preferred embodiment, the cathode material comprises or consists essentially of, by weight, about 81% of the fluorinated carbon and about 12% of a mixture that consists essentially of an oxide of copper (e.g., CuO and/or $Cu_2O$) and an oxide of manganese (e.g., $MnO_2$), about 3% binder material, and about 4% conductive additive. However, such cathode materials may be utilized in an electrochemical cell with a lithium (Li) anode, for primary (non-rechargeable) or secondary (rechargeable) batteries. As a result, in use, lithium or lithium ions may be present in such a cathode material. The presence of such lithium or lithium ions in use should therefore not be viewed in a limiting sense.

Figure 8:
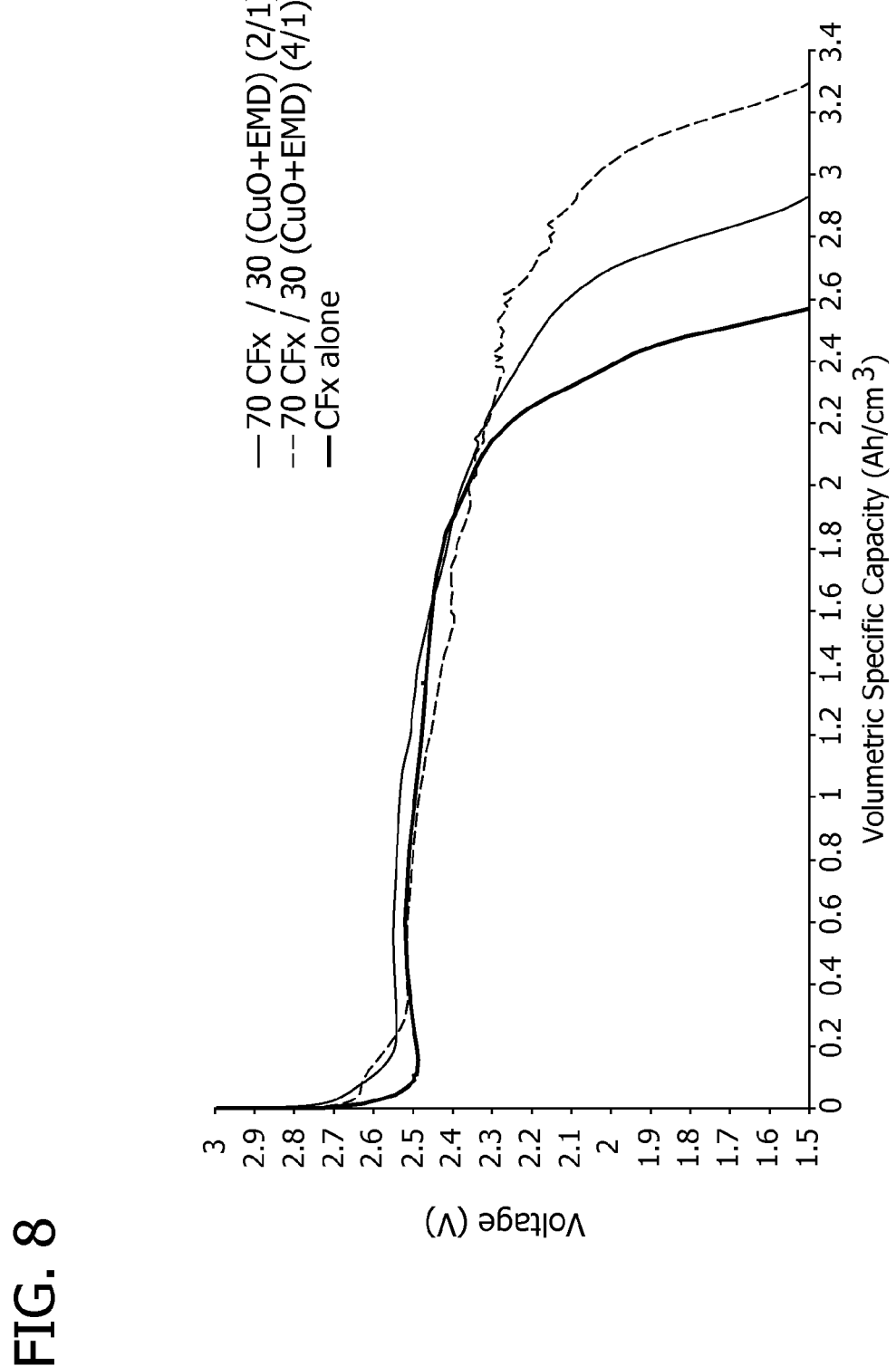
FIG. 8 is a graph illustrating the effect of adding EMD and CuO to CFx has on the volumetric specific capacity of the cathode material; more particularly, the graph illustrates the discharge voltage as a function of volumetric specific capacity for CFx alone, and a CFx/EMD/CuO mixture, in terms of active material alone (the discharge rate here being about 10 mA/g).

In this regard, and referring now to FIG. 8, the graph illustrates the discharge voltage as a function of volumetric specific capacity for $CF_x$ alone, and a $CF_x$/EMD/CuO mixture, in terms of active material alone (the discharge rate here being about 10 mA/g). It is to be noted that, as the graph illustrates, the effect of adding, for example, an oxide of manganese (e.g., EMD) and an oxide of copper (e.g., CuO) to fluorinated carbon (e.g., $CF_x$) has been observed to increase the volumetric specific capacity of the cathode material, as compared for example to fluorinated carbon alone, by for example at least about 10%, about 15%, about 20%, or even about 25%. Furthermore, the graph illustrates that effect is further increased as the ratio of, for example, Cu to Mn increases. Accordingly, for an electrochemical cell of a given volume or dimension, a higher energy output may be achieved using the mixture of cathode materials detailed herein (as a result of, for example, the fact that more active material can be used in preparing the cell to begin with).

Accordingly, in various embodiments of the present disclosure, the electrochemical cell may exhibit a volumetric specific capacity of at least about 2.7 $Ah/cm^3$ at about 2.0 volts, about 2.9 $Ah/cm^3$ at about 1.5 volts, or more.

The electrochemical cell of the present disclosure additionally comprises an anode, which may essentially comprise any anode material suitable for use in non-aqueous electrochemical cells. Typically, however, the anode comprises a metal selected from Group IA or Group IIA of the Periodic Table of the Elements, including for example lithium, magnesium, sodium, potassium, etc., and their alloys and intermetallic compounds, including for example Li—Mg, Li—Al, Li—Al—Mg, Li—Si, Li—B and Li—Si—B alloys and intermetallic compounds. The form of the anode may vary, but typically it is made as a thin foil of the anode metal, and a current collector having an extended tab or lead affixed to the anode foil.

As previously noted, the electrochemical cell of the present disclosure further includes a non-aqueous, ionically conductive electrolyte, which serves as a path for migration of ions between the anode and the cathode electrodes during the electrochemical reactions of the cell. The electrolyte can be in either liquid state or solid state, or both. The electrochemical reaction at the electrodes involves conversions of ions in atomic or molecular forms that migrate from the anode to the cathode. Thus, non-aqueous electrolytes suitable for the present disclosure are substantially chemically inert to the anode and cathode materials. Furthermore, a suitable electrolyte in liquid state exhibits those physical properties that are beneficial for ionic transport (e.g., low viscosity, low surface tension, and/or good wettability).

The various components of the electrolyte may be selected from among those generally known in the art, which are suitable for use in combination with the cathode materials detailed elsewhere herein. Preferably, however, a suitable electrolyte for use in accordance with the present disclosure has an inorganic or organic, ionically conductive salt dissolved in a non-aqueous solvent (or solvent system, when a mixture of solvents is used). More preferably, the electrolyte includes an ionizable alkali metal salt dissolved in an aprotic organic solvent or a mixture of solvents comprising a low viscosity solvent and a high permittivity solvent. Without being held to any particular theory, the inorganic, ionically conductive salt is believed to serve as the vehicle for migration of the anode ions to react with the cathode active material. Accordingly, preferably the ion-forming alkali metal salt is similar to the alkali metal comprising the anode.

In one particular embodiment of the present disclosure, for the electrolyte, the ionically conductive salt preferably has the general formula $MM'F_6$ or $MM'F_4$, wherein M is an alkali metal that is the same as at least one of the metals in the anode and M' is an element selected from the group consisting of phosphorous, arsenic, antimony and boron. Salts suitable for obtaining the formula $M'F_6$ include, for example, hexafluorophosphate ($PF_6$), hexafluoroarsenate ($AsF_6$) and hexafluoroantimonate ($SbF_6$), while salts suitable for obtaining the formula $M'F_4$ include, for example, tetrafluoroborate ($BF_4$). Alternatively, the corresponding sodium or potassium salts may be used. Thus, for a lithium anode, the alkali metal salt of the electrolyte may optionally be selected from, for example, $LiPF_6$, $LiAsF_6$, $LiSbF_6$ and $LiBF_4$, as well as mixtures thereof. Other salts that are useful with a lithium anode include, for example, $LiClO_4$, $LiAlCl_4$, $LiGaCl_4$, $LiC(SO_2CF_3)_3$, $LiB(C_6H_4O_2)_2$, $LiN(CF_3SO_2)_2$ and $Li(CF_3SO_3)$, as well as mixtures thereof.

Low-viscosity solvents that may be suitable for use in accordance with the present disclosure in the electrochemical cell include, for example: dimethyl carbonate (DMC), diethyl carbonate, 1,2-dimethoxyethane (DME), tetrahydrofuran (THF), methyl acetate (MA), diglyme, trigylme, tetragylme, and high permittivity solvents, include for example cyclic carbonates, cyclic esters and cyclic amides (such as propylene carbonate (PC), ethylene carbonate (EC), acetonitrile, dimethyl sulfoxide, dimethyl formamide, dimethyl acetamide, gamma-butyrolactone (GBL), and N-methyl-pyrrolidinone (NMP)), as well as various mixtures or combinations thereof.

The type and composition of the solvent used in the electrolyte, and/or the type and concentration of a salt present therein, may be selected in order to optimize one or more physical and/or performance properties of the electrochemical cell of the present disclosure. For example, in one or more embodiments of the present disclosure, the concentration of the salt in the electrolyte may be in the range of from about 0.5M to about 2.5M, or from about 0.75M to about 2.25M, or from about 1M to about 2M. In these or other embodiments of the present disclosure, wherein a mixed solvent system is employed, the ratio (volume) may range for example from between about 1:9 and about 9:1 of a first solvent (e.g., a carbonate solvent, such as propylene carbonate) and a second solvent (e.g., a substituted alkane solvent, such as 1,2-dimethoxyethane); that is, the solvent system may comprises from about 10 volume % to about 90 volume %, or from about 20 volume % to about 80 volume %, or from about 30 volume % to about 70 volume %, of a first solvent, all or substantially all of the balance of the solvent system being the second solvent. In one preferred embodiment, however, the anode is lithium metal and the preferred electrolyte is 1.0M to 1.8M $LiBF_4$ in a mixed PC/DME solvent system (the concentration of the solvent system being between about 10 volume % PC/90 volume % DME and about 70 volume % PC/90 volume % DME).

The electrochemical cell of the present disclosure additionally comprises a suitable separator material, which is selected to separate the cathode/cathode material from the Group IA or IIA anode/anode material, in order to prevent internal short circuit conditions. The separator is typically selected from materials known in the art to be electrically insulating (and sometimes ionically conductive), chemically non-reactive with the anode and cathode active materials, and both chemically non-reactive with and insoluble in the electrolyte. In addition, the separator material is selected such that it has a degree of porosity sufficient to allow flow through of the electrolyte during the electrochemical reaction of the cell. Finally, the separator material is typically selected to have a thickness ranging from, for example, about 15 microns to about 75 microns, or about 20 microns to about 40 microns.

Accordingly, suitable separator materials typically include, or may be selected from, porous or nonporous polymer membranes, such as for example: polypropylene, polyethylene, polyamide (e.g., nylon), polysulfone, polyvinyl chloride (PVC), and similar materials, and combinations thereof (e.g., a trilayer membrane, such as a trilayer membrane of polypropylene/polyethylene/polypropylene), as well as fabrics woven from fluoropolymeric fibers, including for example polyvinylidine fluoride (PVDF), polyvinylidine fluoride-cohydrofluorpropylene (PVDF-HFP), tetrafluoroethylene-ethylene copolymer (PETFE), chlorotrifluoroethylene-ethylene copolymer, and combinations thereof. Fabrics woven from these fluoropolymeric fibers can be used either alone or laminated a microporous film (e.g., a fluoropolymeric microporous film).

The form or configuration of the electrochemical cell of the present disclosure may generally be selected from those known in the art. In one particular embodiment, however, the form or configuration of the electrochemical cell is a case-negative design, wherein the cathode/anode/separator/electrolyte components are enclosed in a conductive metal casing such that the casing is connected to the anode current collector in a case-negative configuration, although case-neutral design is also suitable. A preferred material for the casing is titanium, although stainless steel, nickel, and aluminum are also suitable. The casing header comprises a metallic lid having a sufficient number of openings to accommodate the glass-to-metal seal/terminal pin feed through for the cathode electrode. The anode electrode is preferably connected to the case. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by welding a stainless steel plug over the fill hole. In this regard it is to be noted, however, that the cell of the present disclosure may alternatively be constructed in a case-positive design. Accordingly, the description provided herein should not be viewed in a limiting sense.

In this regard it is to be further noted that other components of the electrochemical cell (e.g., current collectors, etc.) may be selected from among those components generally known in the art, without departing from the scope of the present disclosure.

Once the cathode material has been prepared, it may be deposited on the cathode current collector in the form of single, substantially homogenous mixture (e.g., wherein the two additional cathode materials—such as an oxide of copper particulate and an oxide of manganese particulate—are dispersed in $CF_x$ particulate, or vice versa, depending on which is the major component and which is the minor component of the cathode material, and then this mixture is deposited in the form of a single layer on the cathode current collector). Alternatively, however, when a mixture of cathode components or materials are used, these materials may be deposited in the form of layers on (i) the same side of the current collector (e.g., a layer of, for example, the oxide of copper, and/or a layer of the oxide of manganese, or a layer of a mixture thereof, deposited on the surface of the current collector, then a layer of $CF_x$ is deposited thereon, or vice versa), or (ii) the opposite sides of the current collector.

It is to be noted that, unless otherwise stated, the various concentrations, concentration ranges, ratios, etc. recited herein, are provided for illustration purposes only and therefore should not be viewed in a limiting sense. It is to be additionally noted that all various combinations and permutations of compositions, concentrations, ratios, components, etc. are intended to be within the scope of and supported by the present disclosure.

2. Cathode Material Preparation

It is to be noted that the various components of the cathode material (e.g., fluorinated carbon, an oxide of copper, an oxide of manganese, etc.) may be obtained from commercial sources (e.g., the $CF_x$ may be, for example, Grade PC/10, commercially available from Lodestar Inc (New Jersey); the $MnO_2$ may be TL-grade electrolytic manganese dioxide, commercially available from Delta EMD (Pty) Ltd, South Africa; and, the Nano-CuO may be a copper oxide, from Alfa Aesar, USA), and/or prepared using methods generally know to those of ordinary skill in the art.

3. Electrochemical Cell Uses and Performance Properties

It is to be noted that the precise composition of the cathode material components (e.g., the fluorinated carbon, and the at least two additional cathode materials, such as the oxide of copper, the oxide of manganese, etc.), and/or the cathode material itself (e.g., the mixture of fluorinated carbon with, for example, the at least two additional cathode materials, such as the oxide of copper and the oxide of manganese), and/or the form thereof (e.g., the particle size), may be selected to optimize it for a desired performance property, and/or the desired end-use application of the electrochemical cell containing it.

The cathode material of the present disclosure is generally suitable for use in essentially any non-aqueous electrochemical cell known in the art. Additionally, such an electrochemical cell of the present disclosure, which contains the noted cathode material, is generally suitable for a number of know applications or devices, including for example: medical devices (such as pace makers, defibrillators, cardiac monitors, drug delivery systems, pain management systems, etc.), portable military electronic devices (such as radios, transponders, weapon sights, etc.), marine devices (such as sonobuoys, torpedoes, etc.), aerospace devices (such as deep space probes, command destruct systems, back-up power systems, etc.), military and commercial sensors, remote data collection systems, among other known applications and devices. Such a cathode material, and more specifically the electrochemical cell containing it, may be particularly advantageous for use in devices requiring end-of-life indicators (e.g., medical devices) due to the voltage plateau the cell posses (as further illustrated elsewhere herein below) during the latter portion of the capacity.

In one particular embodiment, the non-aqueous electrochemical cell of the present disclosure may be configured as a reserve battery or cell, whereby the non-aqueous electrolyte is maintained separately from the electrodes, increasing the useful storage period of the battery over a wide temperature range. When needed, the non-aqueous electrolyte and electrodes may be automatically brought into contact, allowing the battery to function in a normal manner.

The cathode materials of the present disclosure, and the non-aqueous electrochemical cells comprising them, may additionally possess one or more other performance properties that are similar to, if not improved or enhanced as compared to, other materials and cells generally known in the art. For example, in one particular embodiment of the present disclosure, the non-aqueous electrochemical cell may exhibit improved end-of-life behavior. More specifically, in one particular embodiment, the composition (e.g., ratio of copper to manganese), and optionally the ratio or concentration thereof relative to the fluorinated carbon in the cathode material in the cell, enables the electrochemical cell to possess an improved end-of-life indicator, as compared for example to a similarly prepared cathode material in the absence of the ternary mixture of cathode materials detailed herein, the cell for example exhibiting, during discharge, a distinct secondary voltage plateau that is less than a first distinct voltage plateau, which acts to single the approaching end-of-life of the cell. Exemplary end-of-life behavior is further illustrated in one or more Examples, below (see, e.g., FIGS. 6 and 7 and the discussion related thereto).

Having described the disclosure in detail above, it will be apparent that modifications and variations are possible without departing from the scope of the disclosure defined in the appended claims.

The following non-limiting examples are provided to further illustrate the various details and embodiments of the present disclosure.

EXAMPLES

Example 1

Cathode Material Containing $CuO/MnO_2$:

A chemical $MnO_2$ sample was prepared in-house by a known solution precipitation method. Copper oxide, having a particle size of nanometers (Nano-CuO), was obtained from Alfa Aesar; specifically, the particle size of the Nano-CuO was between 23 and 37 nm. The specific area the Nano-CuO was between 25 to 40 $m^2/g$. An amount of each of the $MnO_2$, Nano-CuO, KS-4 graphite (from Timcal Graphite & Carbon), and Teflon PTFE (from Dupont), sufficient to achieve a ratio of 43/27/27/3, was measured and then ground as a mixture with a mortar and pestle to form a sheet paste. To generate a uniform paste, the $MnO_2$, CuO and KS-4 graphite were ground for twenty minutes before the PTFE was added. Cathode discs were punched out and coin cells were assembled with lithium foil anode, separators and electrolyte (as further detailed below). The electrolyte composition was 1.5M LiBF4 in PC/DME (30/70 by volume). The coin cells were discharged on a Maccor battery testing system at the current density of 10 mA/g. FIG. 1 shows the discharge voltage as a function of specific discharge capacity. It is seen in FIG. 1 that there is a plateau of about 65 mAh/g between 2.4 to 2.0V, which is useful for indication of end-of-life for $Li/CF_x$ cells.

Figure 9:
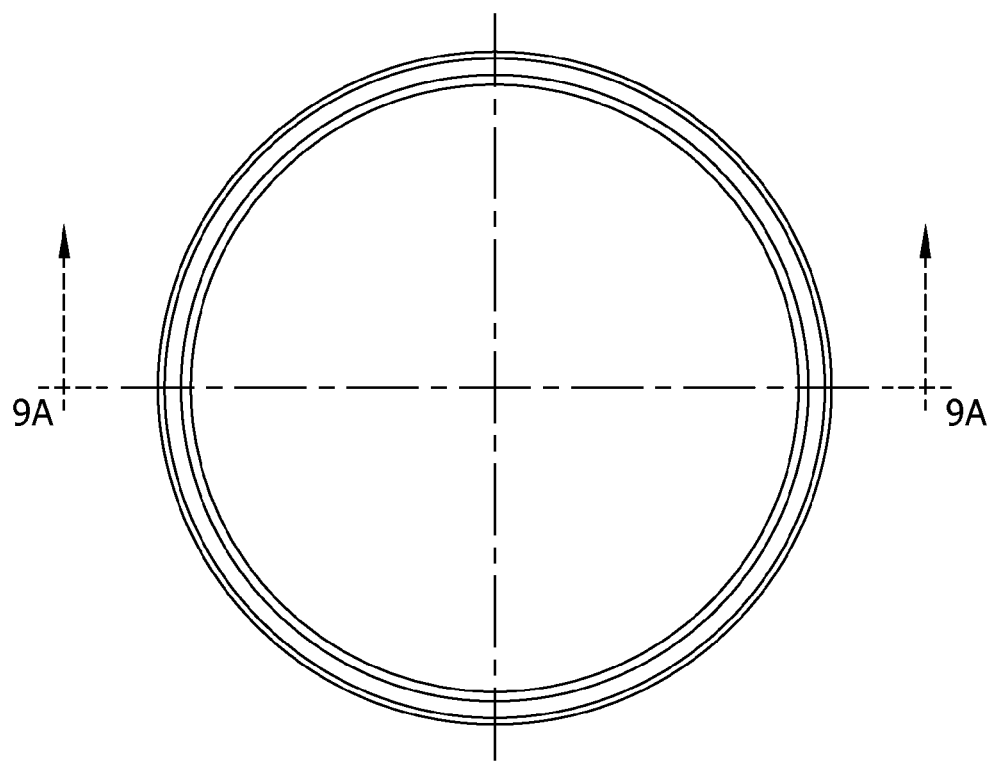
FIGS. 9 and 9A illustrate schematic drawings of a coin cell used for testing various embodiments of the present disclosure, FIG. 9A being a schematic cross-section of the cell if FIG. 9 along line 9A.
Figure 9A:
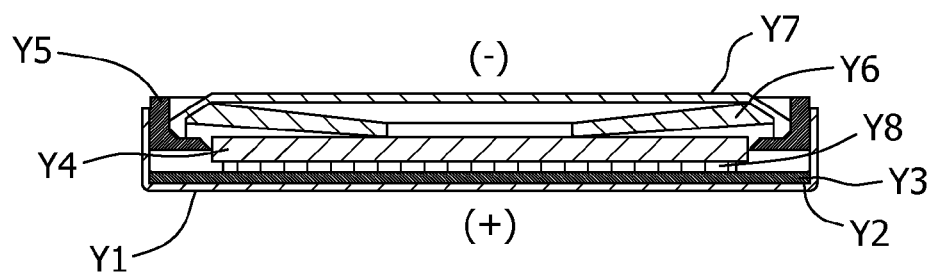

In this regard it is to be noted that an exemplary coin cell battery, suitable for use herein, is illustrated in FIGS. 9 and 9A, may be used as test vehicle (unless otherwise mentioned) to evaluate the discharge characteristics of a cathode that comprises the mixture of cathode materials as detailed herein. With reference to FIGS. 9 and 9A (FIG. 9A being a cross-section of FIG. 9, along the 9A line), an exemplary test cell comprised a cell can (Y1), a cathode (Y2), a separator (Y3), a non-aqueous electrolyte, a stainless steel spacer (Y4), a gasket (Y5), a Belleville spring (Y6), a cell cap (Y7) and an anode (Y8). The cell was used either as a rechargeable or non-rechargeable electrochemical cell. Anode, cathode, separator and the electrolyte were configured to be contained within cell can and cell cap.

In this regard it is to be noted that other electrochemical cells according to various embodiments may be of any configuration, such as a cylindrical wound cell, a prismatic cell, a rigid laminar cell or a flexible pouch, envelope or bag cell.

Example 2

Figure 2:
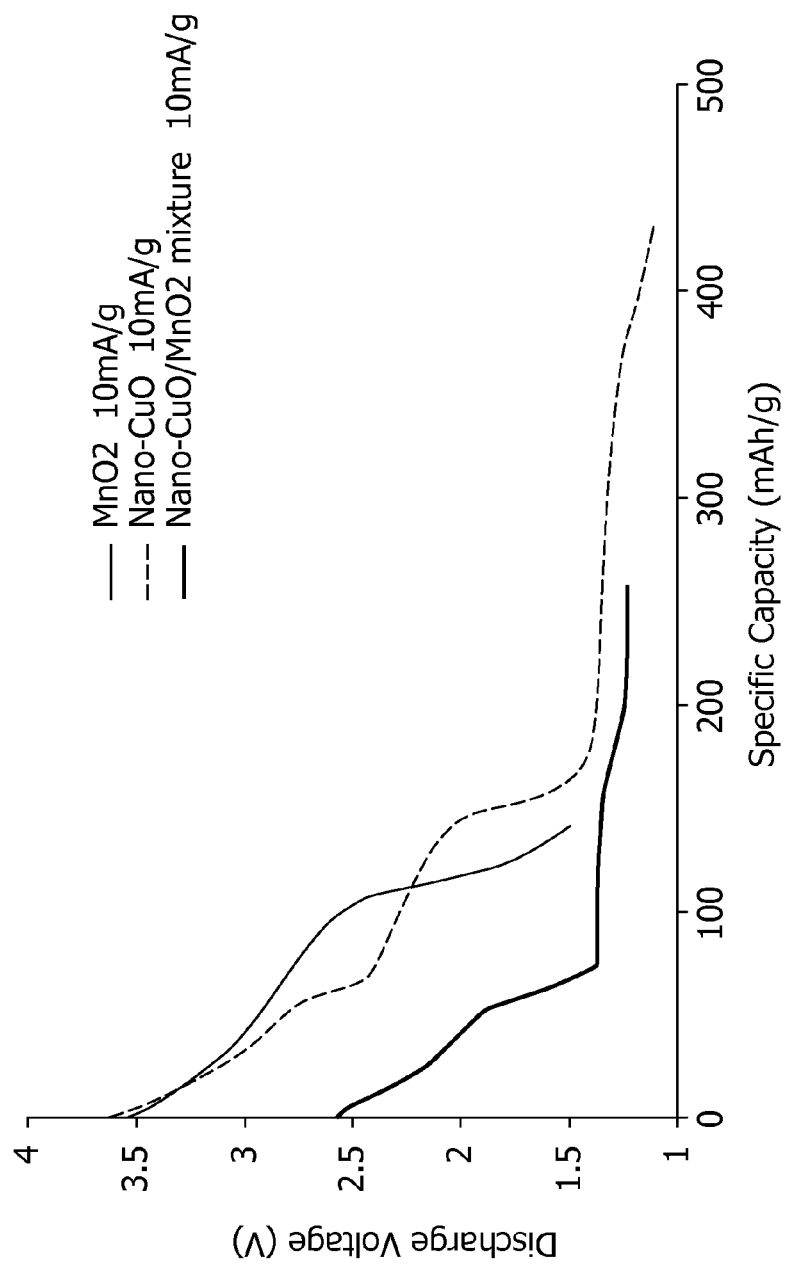
FIG. 2 is a graph for the discharge a Li/(CuO+CMD) cell and a Li/CuO cell.

Cathode Material Containing $CuO/MnO_2$:

An amount of Nano-CuO (from Alfa Aesar), KS-4 graphite (from Timcal Graphite & Carbon), and Teflon PTFE (from Dupont), sufficient to achieve a ratio of 70/25/5, was measured and then ground as a mixture with a mortar and pestle to form a sheet paste. To generate a uniform paste, the CuO and KS-4 graphite were ground for twenty minutes before the PTFE was added. Cathode discs were punched out and coin cells were assembled with lithium foil anode, separators and electrolyte (as detailed above). The electrolyte composition was 1.5M $LiBF_4$ in PC/DME (30/70 by volume). The coin cells were discharged on a Maccor battery testing system at the current density of 10 mA/g. A $MnO_2$ cathode was prepared the same way as in this example, by using the chemical $MnO_2$ mentioned in Example 1. FIG. 2 shows the discharge voltage as a function of specific discharge capacity for the nano-CuO cathode and the $MnO_2$ cathode, in comparison with the discharge performance of the Nano-CuO/$MnO_2$ cathode from Example 1. It is seen in FIG. 2 that the discharge profile can be tuned by using a mixture of nano-CuO and $MnO_2$.

Example 3

Figure 3:
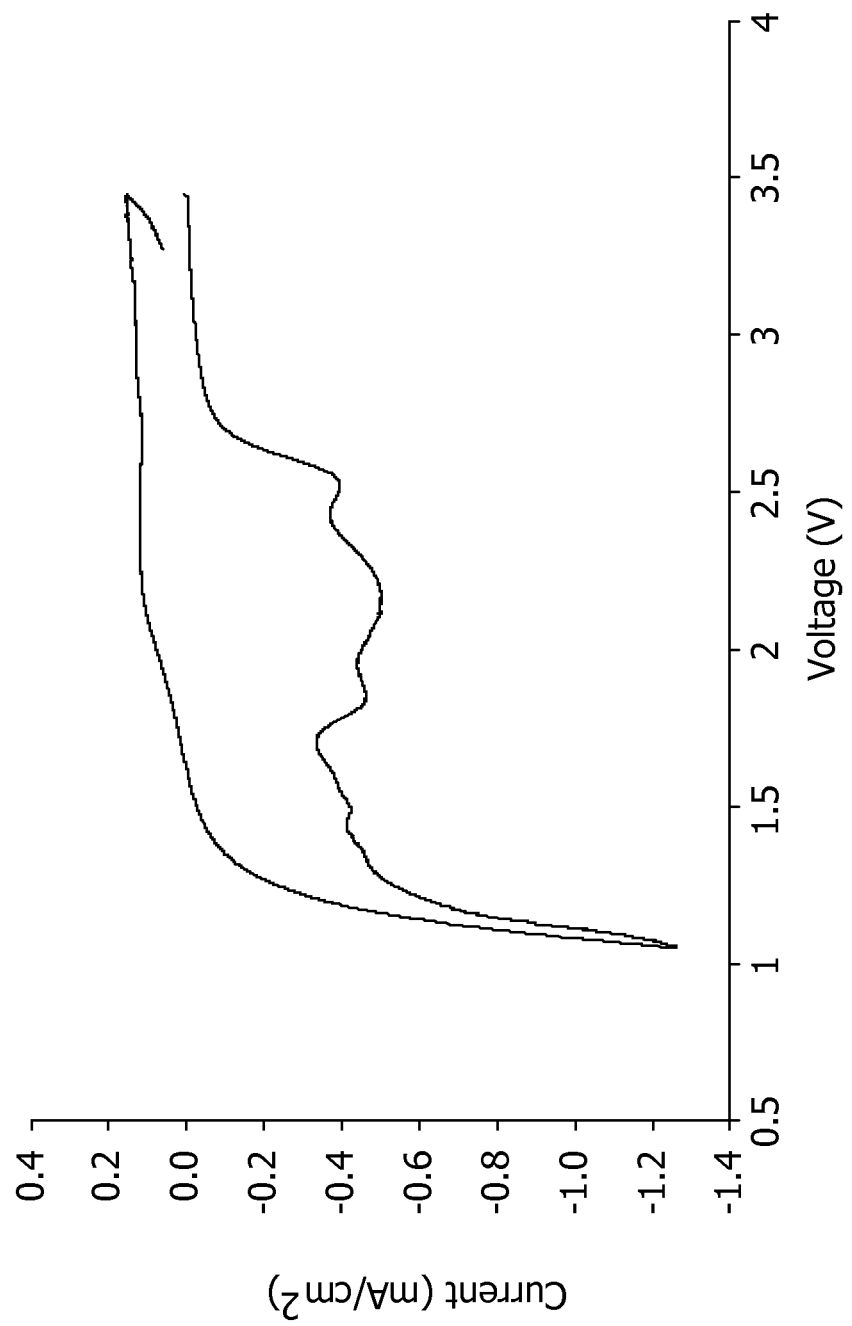
FIG. 3 is a graph for a voltammogram of Li/(CuO+EMD (4/1)) cell.

Cathode Material Containing $CuO/MnO_2$:

An amount of Nano-CuO and heat-treated EMD, sufficient to achieve a weight ratio of 4:1, was blended together and ran through a jet pulverizing system twice. The mixture of CuO/EMD, KS-4 graphite, and Teflon PTFE, in the ratio of 60/35/5, was ground with a mortar and pestle to form a sheet paste. To generate a uniform paste, the CuO/EMD and KS-4 graphite were ground for twenty minutes before the PTFE was added. Cathode discs were punched out and coin cells were assembled with lithium foil anode, separators and electrolyte (as detailed above). The electrolyte composition was 1.5M $LiBF_4$ in PC/DME (30/70 by volume). Cyclic voltammetry was carried out on these coin cells at a voltage scan rate of 0.1 mV/s. FIG. 3 shows several reduction peaks for this cathode material. Of these peaks, the one at about 2.2V is most suitable for indication of end-of-life for $Li/CF_x$ cells.

Example 4

Figure 4:
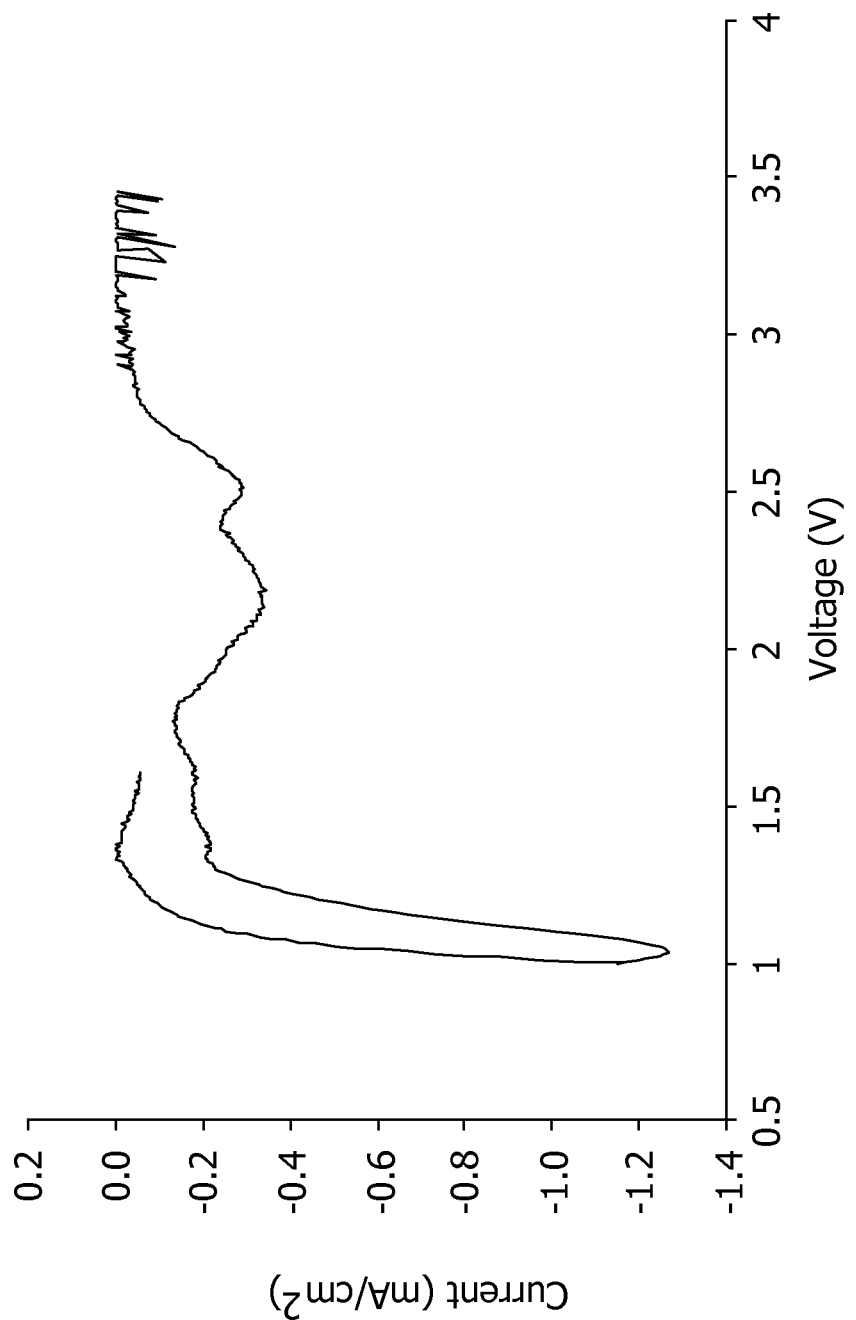
FIG. 4 is a graph for a voltammogram of Li/(CuO+EMD (2/1)) cell.

Cathode Material Containing $CuO/MnO_2$:

An amount of Nano-CuO and heat-treated EMD, sufficient to achieve a weight ratio of 2:1, was blended together and ran through a jet pulverizing system twice. The mixture of CuO/EMD, KS-4 graphite, and Teflon PTFE in the ratio of 60/35/5 was ground with a mortar and pestle to form a sheet paste. To generate a uniform paste, the CuO/EMD and KS-4 graphite were ground for twenty minutes before the PTFE was added. Cathode discs were punched out and coin cells were assembled with lithium foil anode, separators and electrolyte (as detailed above). The electrolyte composition was 1.5M $LiBF_4$ in PC/DME (30/70 by volume). Cyclic voltammetry was carried out on these coin cells at a voltage scan rate of 0.05 mV/s. FIG. 4 shows several reduction peaks for this cathode material. Of these peaks the one at about 2.2V is most suitable for indication of end-of-life for $Li/CF_x$ cells.

Example 5

Figure 5:
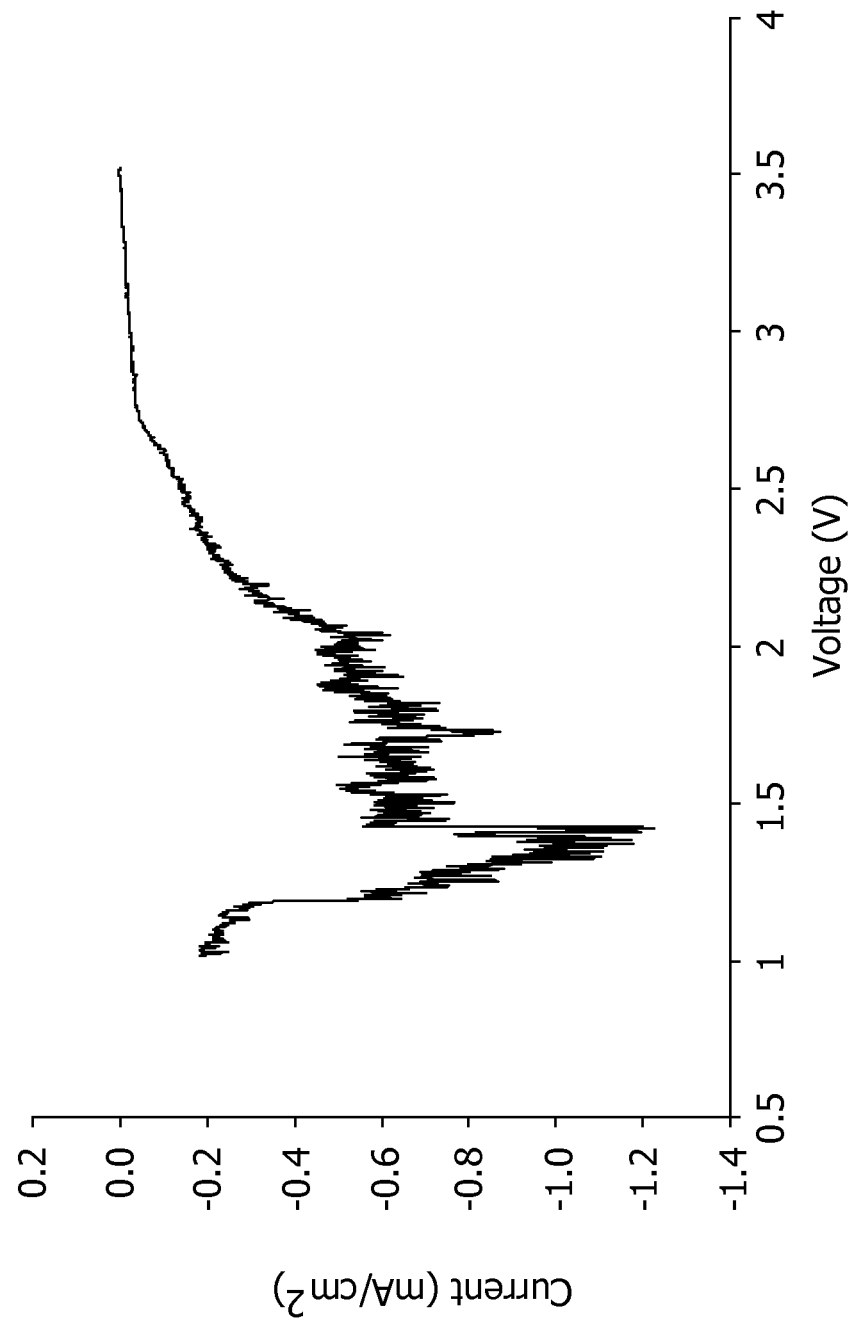
FIG. 5 is a graph for a voltammogram of Li/(CuO+EMD (1/1)) cell.

Cathode Material Containing $CuO/MnO_2$:

An amount of Nano-CuO and heat-treated EMD, sufficient to achieve a weight ratio of 1:1, was blended together and ran through a jet pulverizing system twice. The mixture of CuO/EMD, KS-4 graphite, and Teflon PTFE in the ratio of 60/35/5 was ground with a mortar and pestle to form a sheet paste. To generate a uniform paste, the CuO/EMD and KS-4 graphite were ground for twenty minutes before the PTFE was added. Cathode discs were punched out and coin cells were assembled with lithium foil anode, separators and electrolyte (as detailed above). The electrolyte composition was 1.5M $LiBF_4$ in PC/DME (30/70 by volume). Cyclic voltammetry was carried out on these coin cells at a voltage scan rate of 0.1 mV/s. FIG. 5 shows several reduction peaks for this cathode material. Of these peaks the one at about 1.7V is useful for indication of end-of-life for $Li/CF_x$ cells.

Example 6

Cathode Material Containing $CuO/MnO_2/CF_x$:

An amount of Nano-CuO and heat-treated EMD, sufficient to achieve a weight ratio of 2:1, was blended together and ran through a jet pulverizing system twice. The mixture of CuO/EMD, KS-4 graphite, Super P carbon black and Teflon PTFE in the ratio of 85/5/5/5 was ground with a mortar and pestle to form a sheet paste. To generate a uniform paste, the CuO/EMD, Super P carbon black, and KS-4 graphite were ground for twenty minutes before the PTFE was added. A cathode disc was punched out and was named CuO/EMD layer.

A mixture of $CF_1$, KS-4 graphite, Super P carbon black and Teflon PTFE in the ratio of 85/5/5/5 was ground with a mortar and pestle to form a sheet paste. To generate a uniform paste, $CF_1$, Super P carbon black, and KS-4 graphite were ground for twenty minutes before the PTFE was added. A cathode disc was punched out and was named $CF_1$ layer.

The $CF_1$ layer and CuO/EMD layer in the weight ratio of 85/15 were pressed on top of each other to generate a laminated cathode. Coin cells were assembled by using the laminated cathode, lithium foil anode, separators and electrolyte (as detailed above). The electrolyte composition was 1.5M $LiBF_4$ in PC/DME (30/70 by volume).

Figure 6:
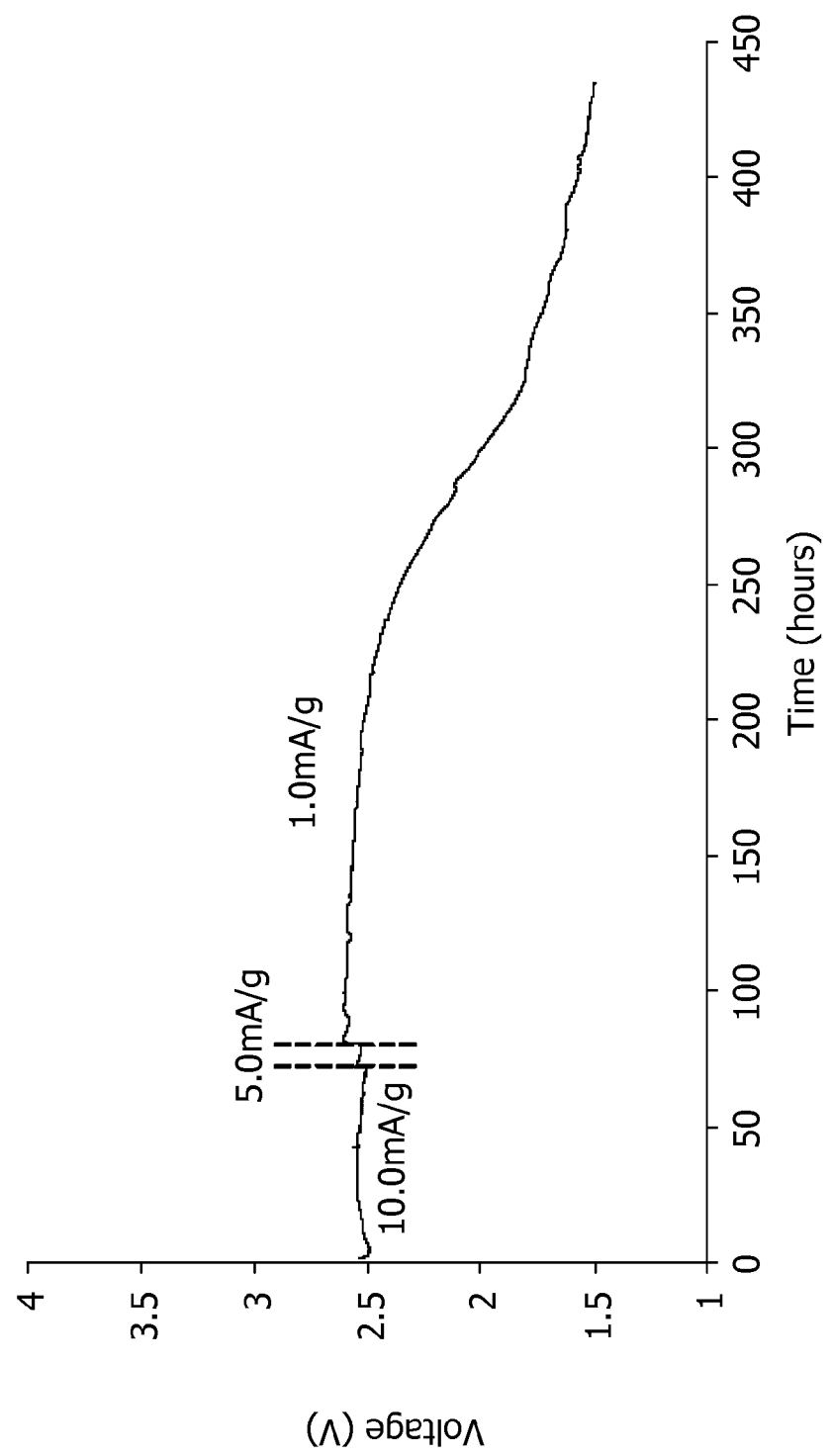
FIG. 6 is a graph for the discharge of Li/(CF1+(CuO+EMD)) cell.

FIG. 6 shows discharge profile for this cathode. The time of about 150 hours at 1 mA/g between 2.2V to 1.5V is most useful as end-of-life indication for this electrochemical cell, corresponding to about 15% of the total discharge capacity.

Example 7

Cathode Material Containing $CuO/MnO_2/CF_x$:

An active material of a mixture of $CF_1$, $CF_{0.6}$, Nano-CuO and heat-treated EMD in the weight ratio of 56/14/20/10 was blended together and ran through a NOBILTA dry powder mixing system (from Hosokawa Micron Corporation). The active material, KS-4 graphite, and PVDF in the ratio of 82/12/6 were mixed in NMP solvent to form a slurry. The slurry was cast onto an aluminum foil and was dried, forming a coating strip. Cathodes of a rectangular geometry were formed out of the coating strip. Electrochemical cells were assembled using the cathode, lithium foil anode, separators and electrolyte. The electrolyte composition was 1.5M LiBF$_4$ in PC/DME (30/70 by volume).

Figure 7:
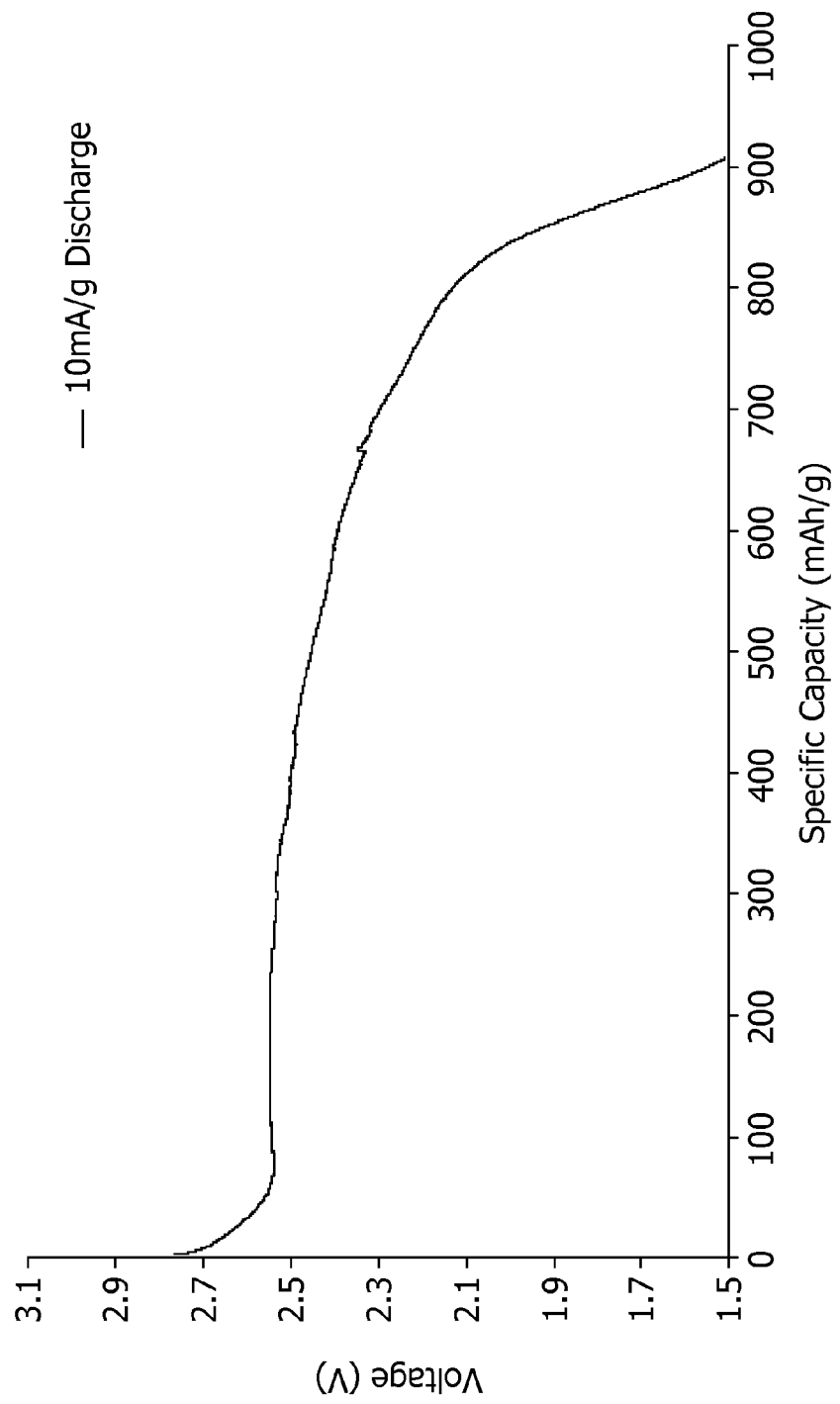
FIG. 7 is a graph for the discharge of Li/(CFx+(CuO+EMD)) cell.

FIG. 7 shows discharge profile for this cathode. At 1.5V cutoff voltage, the discharge capacity is as high as 910 mAh/g, slightly higher than that of CF$_x$. This result will allow reduction of the cost of the active material by replacing a portion of high-cost CF$_x$ as in Li/CF$_x$ cells with low-cost CuO and EMD, while retaining the performance of the cell. Both Li/CuO and Li/MnO$_2$ also have significantly lower thermoneutral potentials than Li/CF$_x$, which is expected to reduce heat production within the cell.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above-described embodiments (e.g., cathode material compositions, electrochemical cell components and configurations, etc.) without departing from the scope of the disclosure, it is intended that all matter contained in the above description and shown in the accompanying figures shall be interpreted as illustrative and not in a limiting sense.

What is claimed is:

1. A non-aqueous electrochemical cell comprising:
an anode;
a cathode comprising a cathode material comprising a mixture of fluorinated carbon, an oxide of copper, and an oxide of manganese;
a separator disposed between the anode and the cathode; and,
a non-aqueous electrolyte which is in fluid communication with the anode, the cathode and the separator,
wherein:
the concentration of the fluorinated carbon in the cathode material mixture is between about 60 wt % and about 95 wt %, based on the total weight of the cathode mixture;
the fluorinated carbon is a mixture of materials having the formulas (CF$_{x1}$)n and (CF$_{x2}$)m, where:
x1 is between about 0.8 to about 1.2,
x2 is between about 0.4 to about 0.8,
n is between about 1 to about 5, and
m is between about 1 to about 5;
(CF$_{x1}$)n and (CF$_{x2}$)m are distinct materials from each other;
a ratio of (CF$_{x1}$) to (CF$_{x2}$) is from about 5:1 to about 1:5; and
a ratio of the oxide of copper to the oxide of manganese or a ratio of the oxide of manganese to the oxide of copper is from about 1:1 to 5:1.

2. The non-aqueous electrochemical cell of claim 1, wherein the oxide of copper is CuO, Cu$_2$O, or a mixture thereof.

3. The non-aqueous electrochemical cell of claim 1, wherein the oxide of manganese is MnO$_2$.

4. The non-aqueous electrochemical cell of claim 1, wherein the weight ratio of the oxide of manganese to the oxide of copper is between about 1:1 and about 3:1.

5. The non-aqueous electrochemical cell of claim 1, wherein the weight ratio of the oxide of copper to the oxide of manganese is between about 1:1 and about 4.5:1.

6. The non-aqueous electrochemical cell of claim 1, wherein the particle size of the oxide of copper is between about 15 and about 45 nanometers.

7. The non-aqueous electrochemical cell of claim 1, wherein the concentration of the fluorinated carbon in the cathode material mixture is at least about 50 wt %, based on the total weight of the cathode mixture.

8. The non-aqueous electrochemical cell of claim 1, wherein the non-aqueous electrolyte comprises an organic solvent selected from the group consisting of dimethyl carbonate (DMC), diethyl carbonate, 1,2-dimethoxyethane (DME), tetrahydrofuran (THF), methyl acetate (MA), diglyme, triglyme, tetraglyme, propylene carbonate (PC), ethylene carbonate (EC), acetonitrile, dimethyl sulfoxide, dimethyl formamide, dimethyl acetamide, gamma-butyrolactone (GBL), and N-methyl-pyrrolidinone (NMP), or a mixture of two or more thereof.

9. The non-aqueous electrochemical cell of claim 8, wherein the non-aqueous electrolyte comprises a salt having a formula MM'F$_6$ or MMF$_4$, wherein M is an alkali metal that is the same as at least one of the metals in the anode and M' is an element selected from the group consisting of phosphorous, arsenic, antimony and boron.

10. The non-aqueous electrochemical cell of claim 9, wherein the salt is selected from the group consisting of LiPF$_6$, LiAsF$_6$, LiSbF$_6$, LiBF$_4$, LiClO$_4$, LiAlCl$_4$, LiGaCl$_4$, LiC(SO$_2$CF$_3$)$_3$, LiB(C$_6$H$_4$O$_2$)$_2$, LiN(CF$_3$SO$_2$)$_2$ and Li(CF$_3$SO$_3$), as well as mixtures thereof.

11. The non-aqueous electrochemical cell of claim 10, wherein the non-aqueous electrolyte comprises a salt, the concentration of the salt in the organic solvent being in the range of between about 0.5 M and about 2.5 M.

12. The non-aqueous electrochemical cell of claim 1, wherein the anode comprises a metal selected from Group IA or Group IIA of the Periodic Table of the Elements.

13. The non-aqueous electrochemical cell of claim 12, wherein the anode comprises a metal selected from the group consisting of lithium, magnesium, sodium, and potassium.

14. The non-aqueous electrochemical cell of claim 13, wherein the anode comprises an alloy or intermetallic compounds selected from the group consisting of Li—Mg, Li—Al, Li—Al—Mg, Li—Si, Li—B and Li—Si—B.

15. The non-aqueous electrochemical cell of claim 1, wherein the cell exhibits a volumetric specific capacity of at least about 2.7 Ah/cm$^3$ at about 2.0 volts.

16. The non-aqueous electrochemical cell of claim 1, wherein the cell exhibits a volumetric specific capacity of at least about 2.9 Ah/cm$^3$ at about 1.5 volts.

17. The non-aqueous electrochemical cell of claim 1, wherein the cathode material comprises about 81 wt % of the fluorinated carbon, and about 12 wt % of a mixture that consists essentially of an oxide of copper and an oxide of manganese, about 3 wt % binder material, and about 4 wt % conductive additive, based on the total weigh of the cathode material.

18. The non-aqueous electrochemical cell of claim 1, wherein the cathode material mixture of fluorinated carbon, and oxide of copper and an oxide of manganese exhibits a volumetric specific capacity that is at least about 10% or greater than a volumetric specific capacity of a fluorinated carbon cathode material alone.

19. The non-aqueous electrochemical cell of claim 1, wherein the cathode material mixture of fluorinated carbon, and oxide of copper and an oxide of manganese exhibits an end-of-life indication that is at least about 5% greater than an end-of-life indication of a fluorinated carbon cathode material alone.

* * * * *